United States Patent
Ballenger

(10) Patent No.: US 10,234,045 B2
(45) Date of Patent: Mar. 19, 2019

(54) THREE POSITION CLOSED CENTER POPPET VALVE

(71) Applicant: Ross Operating Valve Company, Troy, MI (US)

(72) Inventor: Justin R. Ballenger, Canon, GA (US)

(73) Assignee: Ross Operating Valve Company, Troy, MI (US)

( * ) Notice: Subject to any disclaimer, the term of this patent is extended or adjusted under 35 U.S.C. 154(b) by 14 days.

(21) Appl. No.: 15/166,401

(22) Filed: May 27, 2016

(65) Prior Publication Data
US 2017/0067569 A1 Mar. 9, 2017

Related U.S. Application Data

(60) Provisional application No. 62/213,859, filed on Sep. 3, 2015.

(51) Int. Cl.
| | |
|---|---|
| *F16K 11/07* | (2006.01) |
| *F16K 11/10* | (2006.01) |
| *F16K 11/044* | (2006.01) |
| *F15B 13/02* | (2006.01) |
| *F15B 13/04* | (2006.01) |
| *F15B 13/042* | (2006.01) |

(52) U.S. Cl.
CPC ........ *F16K 11/105* (2013.01); *F15B 13/0405* (2013.01); *F16K 11/044* (2013.01);
(Continued)

(58) Field of Classification Search
CPC ...... F15B 13/02; F15B 13/024; F15B 13/025; F15B 13/0402; F15B 13/0403;
(Continued)

(56) References Cited

U.S. PATENT DOCUMENTS

| | | | |
|---|---|---|---|
| 3,294,120 A | 12/1966 | Ruchser | |
| 3,452,781 A | 7/1969 | Napolitano | |

(Continued)

FOREIGN PATENT DOCUMENTS

| | | |
|---|---|---|
| DE | 1093635 B | 11/1960 |
| EP | 0790412 A2 | 8/1997 |

OTHER PUBLICATIONS

International Search Report and Written Opinion for PCT Application No. PCT/US2016/034537 dated Oct. 5, 2016.
(Continued)

*Primary Examiner* — Matthew W Jellett
*Assistant Examiner* — Christopher Ballman
(74) *Attorney, Agent, or Firm* — Carlson, Gaskey & Olds, P.C.

(57) ABSTRACT

A poppet valve includes an inlet port, a first outlet port, a second outlet port, a first exhaust port, a second exhaust port, and a spindle. A first poppet element and a second poppet element each float relative to the spindle. A first piston and a second piston are fixed relative to the spindle. The spindle moves from an initial centered closed position to a first actuated position or a second actuated position to direct air flowing from the inlet port to the first outlet port or the second outlet port, respectively. The initial centered closed position is located between the first actuated position and the second actuated position. A housing contains the spindle, the first poppet element, the second poppet element, the first piston and the second piston.

12 Claims, 3 Drawing Sheets

(52) U.S. Cl.
CPC ............... *F16K 11/07* (2013.01); *F15B 13/02* (2013.01); *F15B 13/024* (2013.01); *F15B 13/025* (2013.01); *F15B 13/0402* (2013.01); *F15B 13/042* (2013.01); *F15B 13/0403* (2013.01); *F15B 2013/0412* (2013.01)

(58) Field of Classification Search
CPC .......... F15B 13/0405; F15B 2013/0412; F16K 11/07; F16K 11/044
See application file for complete search history.

(56) References Cited

U.S. PATENT DOCUMENTS

| | | | |
|---|---|---|---|
| 3,608,587 A | | 9/1971 | Zbell |
| 4,067,357 A | * | 1/1978 | Ruchser .............. F15B 13/0405 |
| | | | 137/596.15 |
| 4,193,423 A | * | 3/1980 | Stoll ................... F15B 13/0402 |
| | | | 137/625.5 |
| 4,793,380 A | * | 12/1988 | Lhota ................... B01D 53/261 |
| | | | 137/596.18 |
| 4,886,091 A | * | 12/1989 | Coleman ............... F15B 13/044 |
| | | | 137/625.65 |
| 2015/0177740 A1 | * | 6/2015 | Haller ................... F15B 11/006 |
| | | | 60/407 |

OTHER PUBLICATIONS

International Preliminary Report on Patentability for PCT Application No. PCT/US2016/034537 dated Jul. 26, 2017.

\* cited by examiner

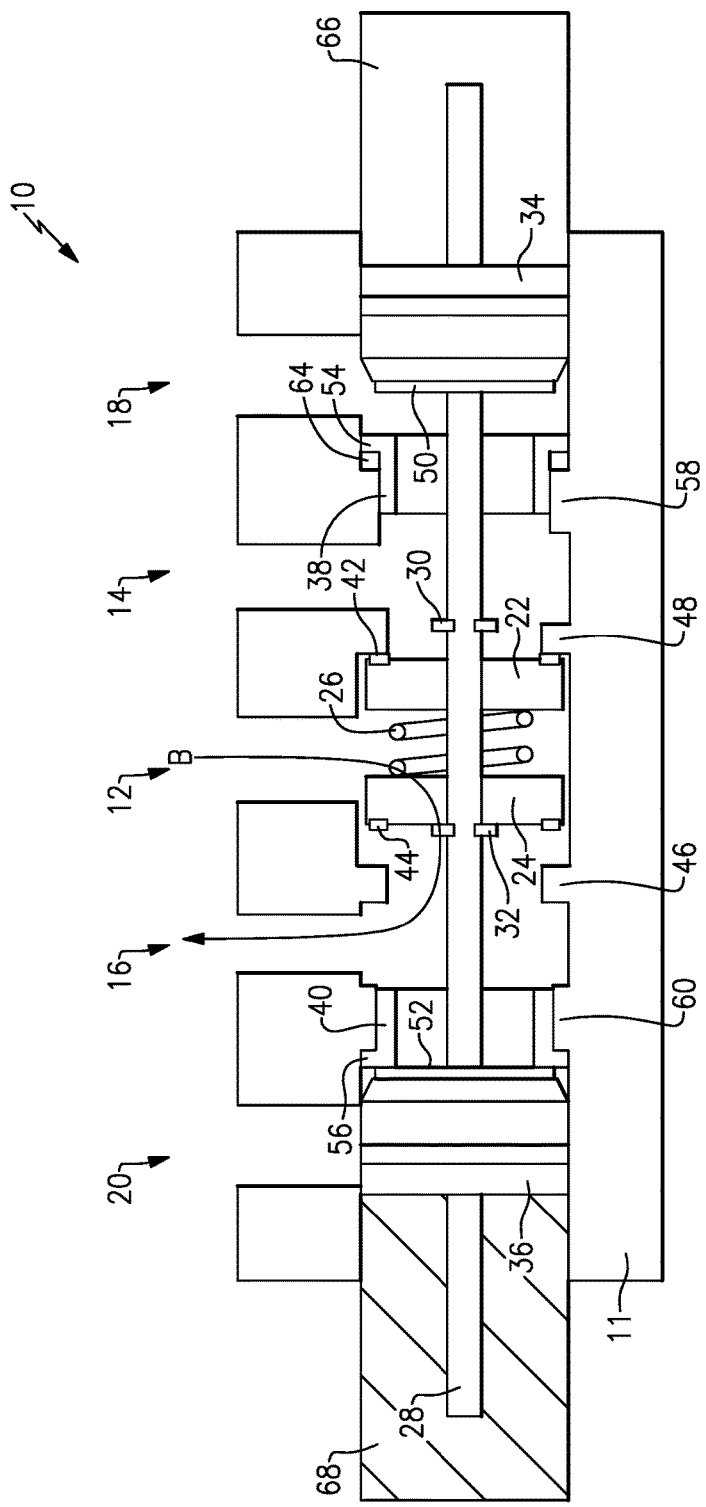

THREE POSITION CLOSED CENTER POPPET VALVE

REFERENCE TO RELATED APPLICATIONS

This application claims priority to U.S. Provisional Application No. 62/213,859 filed on Sep. 3, 2015.

BACKGROUND OF THE INVENTION

A poppet valve usually has two positions; an open position and a closed position. The poppet valve slides within a valve body to a desired position.

SUMMARY OF THE INVENTION

In a featured embodiment, a poppet valve includes an inlet port, a first outlet port, a second outlet port, a first exhaust port, a second exhaust port, and a spindle. A first poppet element and a second poppet element each float relative to the spindle. A first piston and a second piston are fixed relative to the spindle. The spindle moves from an initial centered closed position to a first actuated position or a second actuated position to direct air flowing from the inlet port to the first outlet port or the second outlet port, respectively. The initial centered closed position is located between the first actuated position and the second actuated position. A housing contains the spindle, the first poppet element, the second poppet element, the first piston and the second piston.

In another embodiment according to the previous embodiment, a resilient member is located between the first poppet element and the second poppet element and biases the first poppet element and the second poppet element away from each other.

In another embodiment according to any of the previous embodiments, the spindle includes a first shoulder and a second shoulder located outwardly of the first poppet element and the second poppet element, respectively. When the poppet valve is in the initial centered closed position, the resilient member biases the first poppet element against the first fixed shoulder and the second poppet element against the second fixed shoulder.

In another embodiment according to any of the previous embodiments, a first seal and a second seal are attached to the first poppet element and the second poppet element, respectively. When the poppet valve is in the initial centered closed position, the first seal and the second seal contact a first annular protrusion and a second annular protrusion, respectively, of the housing, preventing the air from entering the poppet valve.

In another embodiment according to any of the previous embodiments, the poppet valve includes a first mid-piston and a second mid-piston that float on the spindle and that seal against the first piston and the second piston, respectively. The first mid-piston and the second mid-piston each include a first circumferential flange and a second circumferential flange, respectively. The first piston and the second piston include another first seal and another second seal, respectively, that can contact the first mid-piston and the second mid-piston, respectively.

In another embodiment according to any of the previous embodiments, when the poppet valve is in the first actuated position, the air entering through the inlet is directed to a first space between the first circumferential flange of the first mid-piston and the first annular protrusion of the housing, moving the spindle in a first direction. The second fixed shoulder engages and moves the floating second poppet element in the first direction, compressing the resilient member between the first poppet element and the second poppet element. When the poppet valve is in the second actuated position, the air entering through the inlet is directed to a second space between the second circumferential flange of the second mid-piston and the second annular protrusion of the housing, moving the spindle in a second direction opposite to the first direction. The first fixed shoulder engages and moves the floating first poppet element in the second direction, compressing the resilient member between the first poppet element and the second poppet element.

In another embodiment according to any of the previous embodiments, when the poppet valve is moving to the first actuated position, the second piston moves in the first direction and engages and moves the second mid-piston. The second circumferential flange of the second mid-piston engages the second annular protrusion of the housing, preventing further movement of the spindle. The first piston is spaced from the first mid-piston.

In another embodiment according to any of the previous embodiments, when a pilot applies the air to the first piston in response to a signal, air enters the inlet and flows through the first outlet to a workpiece.

In another embodiment according to any of the previous embodiments, when the poppet valve is moving to the second actuated position, the first piston moves in the second direction and engages and moves the first mid-piston. The first circumferential flange of the first mid-piston engages the first annular protrusion of the housing, preventing further movement of the spindle. The second piston is spaced away from the second mid-piston.

In another embodiment according to any of the previous embodiments, when a pilot applies the air to the second piston in response to a signal, air enters the inlet and flows through the second outlet to a workpiece.

BRIEF DESCRIPTION OF THE DRAWINGS

Other advantages of the present invention can be understood by reference to the following detailed description when considered in connection with the accompanying drawings wherein:

FIG. 3 illustrates the poppet valve in a second actuated position.

DETAILED DESCRIPTION OF THE PREFERRED EMBODIMENTS

Figure 1:
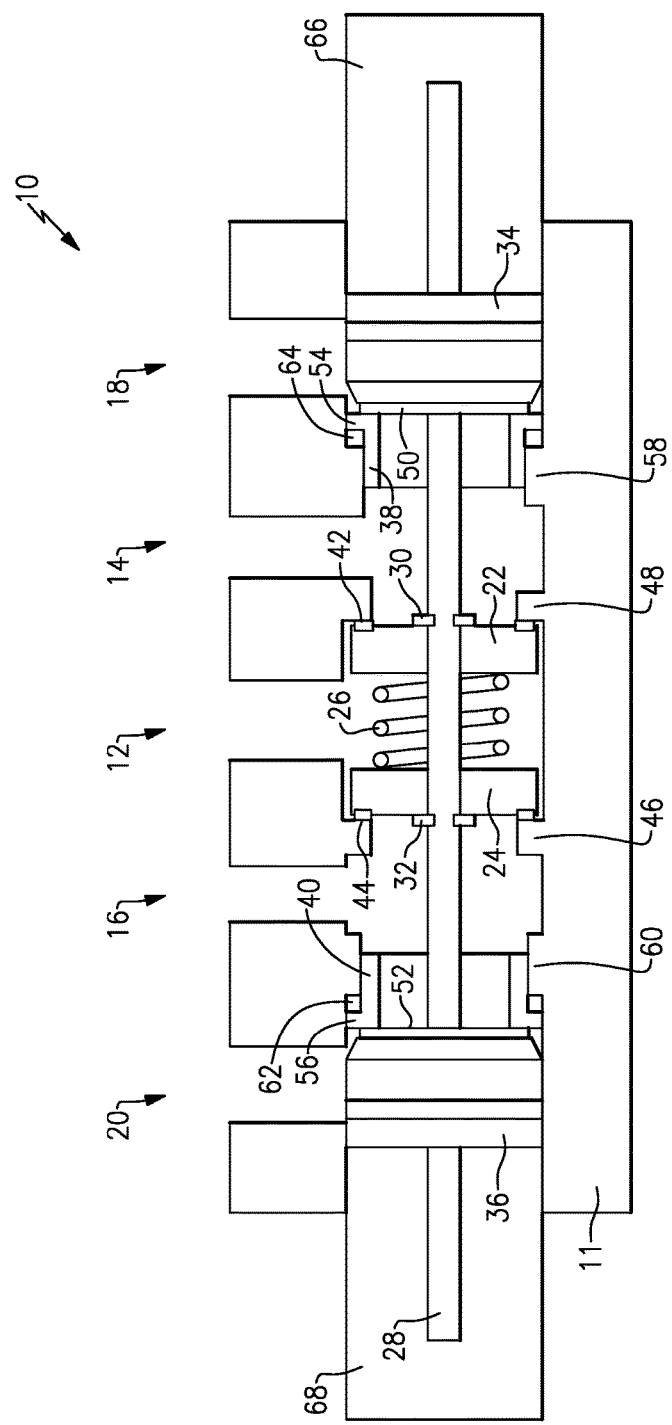
FIG. 1 illustrates a poppet valve in an initial centered closed position.

FIG. 1 illustrates a three position poppet valve 10 in an initial centered closed position. The poppet valve 10 includes a housing 11 having an inlet port 12, a first outlet port 14 (or working port), a second outlet port 16 (or working port), a first exhaust port 18, and a second exhaust port 20. When the poppet valve 10 is in the initial centered closed position (for example, centered within the housing 11), all the ports 12, 14, 16, 18 and 20 are blocked, preventing the flow of fluid through them. When the poppet valve 10 is actuated, one of the outlet ports 14 and 16 is in fluid communication with the inlet port 12, directing air towards a workpiece (not shown).

The poppet valve 10 includes a first poppet element 22 and a second poppet element 24 separated by and biased away from each other by a resilient member 26. In one example, the resilient member 26 is a spring. The first poppet element 22 and the second poppet element 24 can float or can slide on a spindle 28. That is, the first poppet element 22 and the second poppet element 24 can move relative to the spindle 28 and are unattached to the spindle 28. In the closed position, the spindle 28 and the associated features are in an initial centered closed position. The first poppet element 22 and the second poppet element 24 include a first seal 42 and a second seal 44, respectively. In one example, the first seal 42 and the second seal 44 are circumferential seals. In the closed position, air is directed towards the inlet port 12, but the air is blocked from entering the poppet valve 10 by the first seal 42 and the second seal 44 each located between the first poppet element 22 and the second poppet element 24, respectively, and the first annular protrusion 46 and the second annular protrusion 48, respectively, of the housing 11.

A first fixed shoulder 30 and a second fixed shoulder 32 are attached to the spindle 28 and act upon the first poppet element 22 and the second poppet element 24, respectively, when the spindle 28 moves. The first fixed shoulder 30 is located outwardly of the first poppet element 22, and the second fixed shoulder 32 is located outwardly of the second poppet element 24. When the poppet valve 10 is in the closed position, the resilient member 26 biases the first poppet element 22 against the first fixed shoulder 30 and the second poppet element 24 against the second fixed shoulder 32.

The poppet valve 10 also includes a first piston 34 and a second piston 36 that are rigidly connected or attached to the spindle 28. The poppet valve 10 also includes a first mid-piston 38 and a second mid-piston 40 that float or can slide relative to the spindle 28 in the housing 11 and that seal against the first piston 34 and the second piston 36, respectively. The first mid-piston 38 and the second mid-piston 40 have a first circumferential flange 54 and a second circumferential flange 56, respectively. The first piston 34 and the second piston 36 include a first seal 50 and a second seal 52, respectively, that can seal against the first mid-piston 38 and the second mid-piston 40, respectively. The first seal 50 and the second seal 52 are circumferential or planar. The poppet valve 10 includes a first enclosed end cavity 66 and a second enclosed end cavity 68 each located outwardly of the first piston 34 and the second piston 36, respectively. In the initial centered closed position, there is no air pressure in the areas defined by a first enclosed end cavity 66 and a second enclosed end cavity 68.

Figure 2:
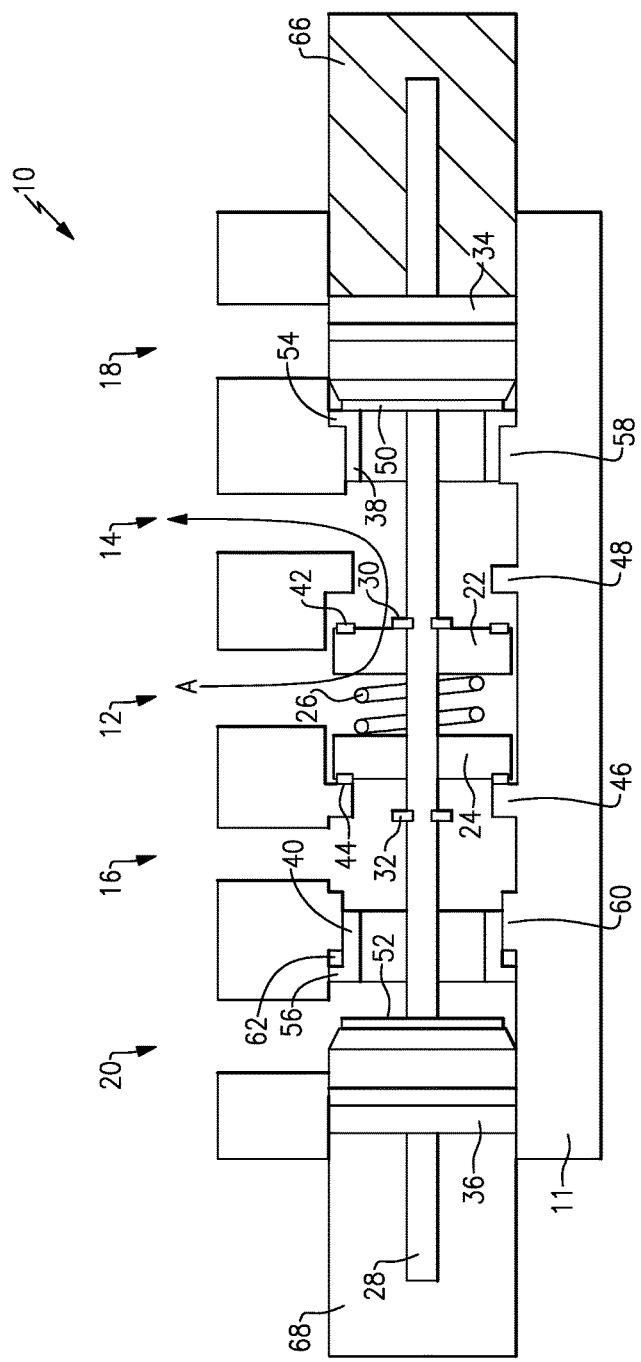
FIG. 2 illustrates the poppet valve in a first actuated position.

FIG. 2 illustrates the poppet valve 10 in a first actuated position. In the first actuated position, air pressure is supplied to the first enclosed end cavity 66 in response to a signal, causing the first piston 34 to shift to the left (in a first direction) relative to FIG. 2. Air is also directed into a space 62 between the first circumferential flange 54 of the first mid-piston 40 and another first annular protrusion 58 of the housing 11.

As the spindle 28 moves to the left relative to FIG. 2, the first fixed shoulder 30 engages and moves the floating first poppet element 22 to the left, compressing the resilient member 26 between the first poppet element 22 and the second poppet element 24. The resilient member 26 presses the second poppet element 24 against the second annular protrusion 46, preventing the flow of air through the second outlet port 16.

The fixed first piston 34 attached to the spindle 28 also moves to the left and engages and presses the first circumferential flange 54 of the floating first mid-piston 38 against the another first annular protrusion 58 of the housing 11, preventing further movement of the spindle 28. Movement of the spindle 28 to the left causes the fixed second piston 36 to move away from and to the left of the floating second mid-piston 40.

When a pilot (not shown) applies air pressure to the first fixed piston 34 in response to a signal, the spindle 28 moves to the left. The poppet valve 10 is in the first actuated position, and air A enters the inlet port 12 and flows through the first outlet port 14 to a workpiece. The second outlet port 16, the first exhaust port 18 and the second exhaust port 20 are also open, although air does not flow through these ports.

FIG. 3 illustrates the poppet valve 10 in a second actuated position. In the second actuated position, air pressure is supplied to the second enclosed end cavity 68 in response to a signal, causing the second piston 36 to shift to the right (a second direction opposite to the first direction) relative to FIG. 3. Air is also directed into a space 64 between the second circumferential flange 56 of the second mid-piston 38 and another second annular protrusion 60 of the housing 11 in response to a signal.

As the spindle 28 moves to the right relative to FIG. 3, the second fixed shoulder 32 engages and moves the floating second poppet element 24 to the right, compressing the resilient member 26 between the first poppet element 22 and the second poppet element 24. The resilient member 26 presses the first poppet element 22 against the first annular protrusion 48, preventing the flow of air through the first outlet port 14.

The fixed second piston 36 attached to the spindle 28 also moves to the right and engages and presses the second circumferential flange 56 of the floating second mid-piston 40 against the another second annular protrusion 60 of the housing 11, preventing further movement of the spindle 28. Movement of the spindle 28 to the right causes the fixed first piston 34 to move away from and to the right of the floating first mid-piston 38.

When a pilot (not shown) applies air pressure to the second fixed piston 36 in response to a signal, the spindle 28 moves to the right. The poppet valve 10 is in the second actuated position, and air B enters the inlet port 12 and flows through the second outlet port 16 to a workpiece. The first outlet port 14, the first exhaust port 18 and the second exhaust port 20 are also open, although air does not flow through these ports.

By providing a centered closed position, the poppet valve 10 can be in an initial position where the flow of air though the exhaust and the outlets is completely shut off.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A poppet valve comprising:
an inlet port, a first outlet port, a second outlet port, a first exhaust port, and a second exhaust port a spindle;
a first poppet element and a second poppet element that each float relative to the spindle;
a first piston and a second piston that are each fixed relative to the spindle, wherein the spindle moves from an initial centered closed position to a first actuated position or a second actuated position to direct air flowing from the inlet port to the first outlet port or the second outlet port, respectively, and the initial centered closed position is located between the first actuated position and the second actuated position; and
a first mid-piston and a second mid-piston that float on and move relative to the spindle and that seal against the first piston and the second piston, respectively, and the first mid-piston and the second mid-piston each include a first circumferential flange and a second circumferential flange, respectively, wherein, when the spindle is in the initial centered position, the first piston contacts the first mid-piston, and the second piston contacts the second mid-piston,
a housing including a first mid-piston annular protrusion and a second mid-piston annular protrusion, wherein the housing contains the spindle, the first poppet element, the second poppet element, the first piston, and the second piston, wherein the first mid-piston contacts the first mid-piston annular protrusion when in the first actuated position and the second mid-piston contacts the second mid-piston annular protrusion when in the second actuated position.

2. The poppet valve as recited in claim 1 wherein a resilient member is located between the first poppet element and the second poppet element and biases the first poppet element and the second poppet element away from each other.

3. The poppet valve as recited in claim 1 wherein the spindle includes a first shoulder and a second shoulder located outwardly of the first poppet element and the second poppet element, respectively, and when the poppet valve is in the initial centered closed position, the resilient member biases the first poppet element against the first shoulder and the second poppet element against the second shoulder.

4. The poppet valve as recited in claim 3 wherein the housing includes a first poppet annular protrusion and a second poppet annular protrusion, the poppet valve includes a first poppet seal and a second poppet seal attached to the first poppet element and the second poppet element, respectively, and when the poppet valve is in the initial centered closed position, the first seal and the second seal contact the first poppet annular protrusion and the second poppet annular protrusion, respectively, preventing the air from entering the poppet valve.

5. The poppet valve as recited in claim 4 including a first piston seal and a second piston seal attached to the first piston and the second piston, respectively, located between the first mid-piston and the second mid-piston, respectively.

6. The poppet valve as recited in claim 1 wherein the first mid-piston and the second mid-piston float relative to the first piston and the second piston.

7. The poppet valve as recited in claim 1 wherein a resilient member is located between the first poppet and the second poppet, the first mid-piston is located between the first piston and the first poppet, and the second mid-piston is located between the second piston and the second poppet.

8. A poppet valve comprising:
an inlet port, a first outlet port, a second outlet port, a first exhaust port, and a second exhaust port
a spindle;
a first poppet element and a second poppet element that each float relative to the spindle;
a first piston and a second piston that are each fixed relative to the spindle, wherein the spindle moves from an initial centered closed position to a first actuated position or a second actuated position to direct air flowing from the inlet port to the first outlet port or the second outlet port, respectively, and the initial centered closed position is located between the first actuated position and the second actuated position; and
a first mid-piston and a second mid-piston that float on and move relative to the spindle and that seal against the first piston and the second piston, respectively, and the first mid-piston and the second mid-piston each include a first circumferential flange and a second circumferential flange, respectively,
a housing that contains the spindle, the first poppet element, the second poppet element, the first piston, and the second piston, wherein the spindle includes a first shoulder and a second shoulder located outwardly of the first poppet element and the second poppet element, respectively, and when the poppet valve is in the initial centered closed position, the resilient member biases the first poppet element against the first shoulder and the second poppet element against the second shoulder,
wherein the housing includes a first poppet annular protrusion and a second poppet annular protrusion, the poppet valve includes a first poppet seal and a second poppet seal attached to the first poppet element and the second poppet element, respectively, and when the poppet valve is in the initial centered closed position, the first seal and the second seal contact the first poppet annular protrusion and the second poppet annular protrusion, respectively, preventing the air from entering the poppet valve,
wherein the housing includes a first mid-piston annular protrusion and a second mid-piston annular protrusion,
wherein the air entering through the inlet is directed to a first space between the first circumferential flange of the first mid-piston and the first mid-piston annular protrusion of the housing, moving the spindle in a first direction, and the first shoulder engages and moves the floating first poppet element in the first direction, compressing the resilient member between the first poppet element and the second poppet element when the poppet valve moves to the first actuated position, and
wherein the air entering through the inlet is directed to a second space between the second circumferential flange of the second mid-piston and the second mid-piston annular protrusion of the housing, moving the spindle in a second direction opposite to the first direction, and the second shoulder engages and moves the floating second poppet element in the second direction, compressing the resilient member between the first poppet element and the second poppet element when the poppet valve moves to the second actuated position.

9. The poppet valve as recited in claim 8 wherein, when the poppet valve moves to the first actuated position, the second piston moves in the first direction and engages and moves the second mid-piston, the second circumferential flange of the second mid-piston engages the second mid-piston annular protrusion of the housing, preventing further movement of the spindle, and the first piston is spaced from the first mid-piston.

10. The poppet valve as recited in claim 9 wherein, when a pilot applies the air to the first piston in response to a signal, the air enters the inlet and flows through the first outlet to a workpiece.

11. The poppet valve as recited in claim 8 wherein, when the poppet valve moves to the second actuated position, the first piston moves in the second direction and engages and moves the first mid-piston, the first circumferential flange of the first mid-piston engages the first mid-piston annular protrusion of the housing, preventing further movement of the spindle, and the second piston is spaced away the second mid-piston.

12. The poppet valve as recited in claim 11 wherein, when a pilot applies the air to the second piston in response to a signal, the air enters the inlet and flows through the second outlet to a workpiece.

\* \* \* \* \*